United States Patent

[11] 3,590,333

[72] Inventor Alvin S. Blum
 700 Palerno Ave., Coral Gables, Fla. 33134
[21] Appl. No 789,052
[22] Filed Dec. 31, 1968
[45] Patented June 29, 1971

[54] IDENTIFICATION SYSTEM
 8 Claims, 4 Drawing Figs.

[52] U.S. Cl.................................................. 317/134,
 340/149, 340/174.1
[51] Int. Cl....................................................E05b 49/00,
 H01h 47/22
[50] Field of Search.......................................... 340/149,
 149 A, 174.1 F, 152, 174.1 B; 235/61.7, 61.7 B;
 317/134

[56] References Cited
 UNITED STATES PATENTS
 3,412,483 11/1968 Jacobs............................ 35/35
 3,445,633 5/1969 Ratner........................... 235/61.7
 3,393,270 7/1968 Simjian.......................... 178/26
 3,221,304 11/1965 Enikeiff et al. ............... 340/149
 2,914,746 11/1969 James............................ 340/149
 3,428,316 11/1969 Block et al..................... 340/149

OTHER REFERENCES
Allen, Lowell G., " Data Comparison Device," IBM TECHNICAL DISCLOSURE BULLETIN, Vol. 2, No. 4, Dec. 1959, pp. 123, 124, copy in 340-174.1 B Primary Examiner—Lee T. Hix
Assistant Examiner—C. L. Yates
Attorney—Eugene F. Malin ABSTRACT: An identification system including a card preparation system, a memory system, remote card reading stations, a comparator, accessory device, and a control means connected between each of said items. The card preparation system records distinct patterns on identification cards. The control means directs the operation of the information retrieval system. The memory system stores identifying information characteristics as well as distinct coded patterns that are placed on the cards. The remote card reading stations provide relative movement between the card being read and the reading head in the station in order to generate a train of electrical impulses. The comparator compares the train of electrical impulses from a remote station and a train of electrical impulses from the memory system. The comparator signals a match or mismatch to the control means in order to operate various accessory devices.

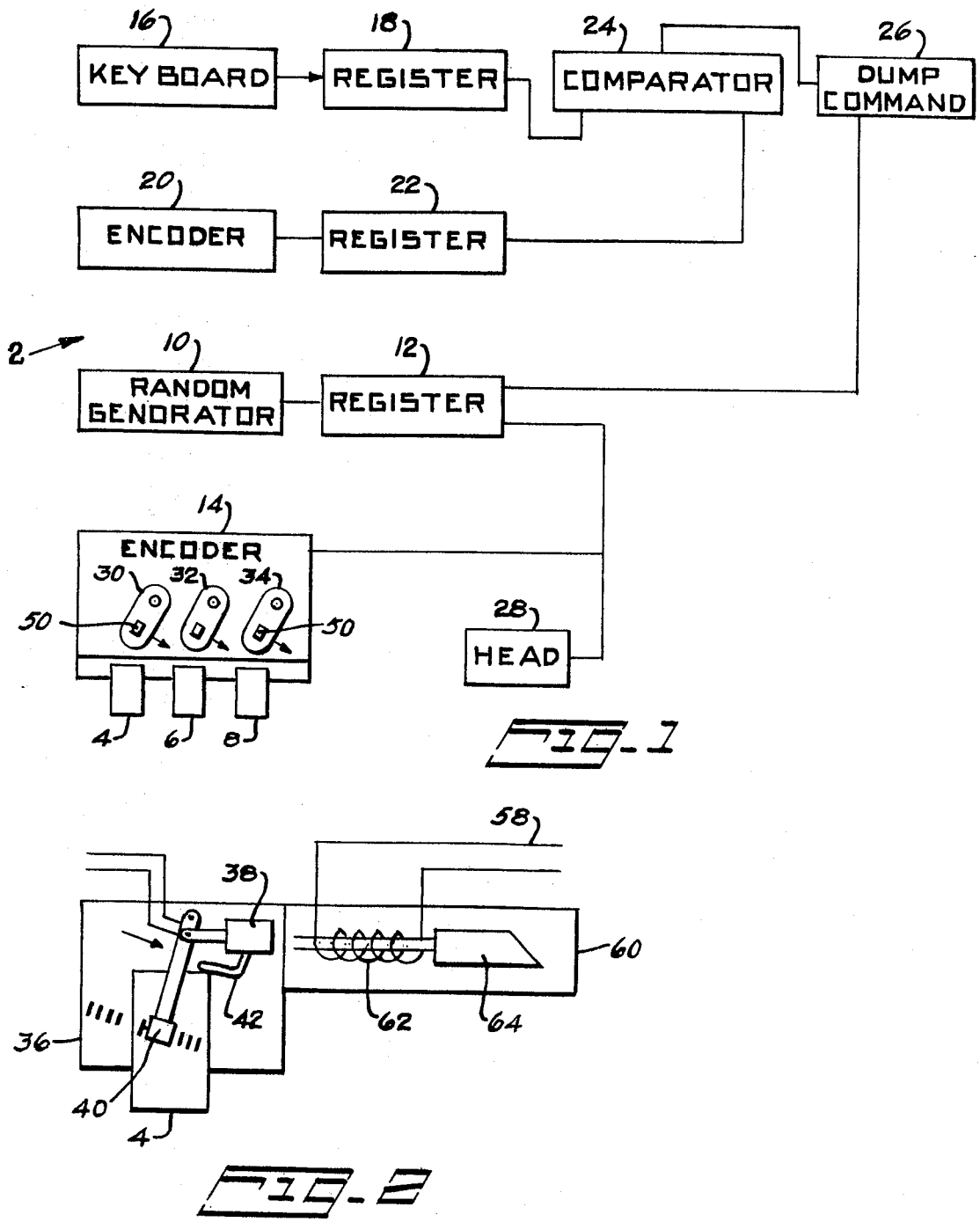

IDENTIFICATION SYSTEM

BACKGROUND OF THE INVENTION

This invention relates to a new and improved identification system, and, more particularly, to a system for preparing coded instruments, storing the codes in a memory system, reading the code on the instrument at remote stations by producing relative movement between the instrument and the reading head in order to generate a train of impulses, and comparing the train of impulses with the stored code to generate a control signal for operating various mechanisms, such as opening a lock or storing time card information.

As is perhaps well known, identification card systems for identifying and controlling persons entering or exiting manufacturing plants or laboratories are old in the art. Various monitor systems with fixed readers for reading fixed coded cards have been proposed and used in the past.

SUMMARY OF THE INVENTION

The present invention relates to a new and improved identification system that includes in one embodiment a control means for directing the signal traffic between a card preparation system, the memory system, and remote reading stations. The card preparation system is utilized to generate and record code patterns on identification cards. The code patterns together with access information, such as, reading station numbers, are stored in a memory system in the identification system. The remote reading stations include reproducing means that are moved relative to a coded identification card or instrument placed in the station. A distinct train of electrical impulses is generated by the relative movement of the reproducing head over the code pattern on the card. The impulses are forwarded through control means to a comparator. The control means also conveys the recorded code pattern from the memory system to the comparator. The comparator compares the two input signals to identify the card holder by a match or mismatch output signal. The output signal may be utilized to open a lock at the remote station, or operate other accessory devices.

It is an object of this invention to provide a noncomplex card preparation system for producing low cost changeable coded instruments or cards.

Another object of this invention is to provide remote card reading stations with means to provide relative movement between the reproducing means and the card to produce a train of electrical impulses from the coded card.

Another object of this invention is to provide a card reader that produces a distinct train of electrical impulses from a card having a code pattern recorded thereon.

A further object of this invention is to provide a noncomplex changeable locking system for hotels and other businesses.

A further object of this invention is to provide a changeable locking system that identifies the location of the remote station being activated by a coded card.

A further object of this invention is to provide a changeable locking system that identifies the classification of the party gaining access to particular areas.

An additional object of this invention is to provide an identification system including a noncomplex preparation system for providing coded instruments for particular locations and storing the codes for the particular locations, with remote instrument reading stations at each location producing a train of electrical impulses from the coded instruments to be compared with the stored code to produce a match or mismatch signal to open a lock or perform other functions.

In accordance with these and other objects which will be apparent hereinafter, the instant invention will now be described with particular reference to the accompanying drawings.

BRIEF DESCRIPTION OF THE DRAWINGS

In the drawings:

FIG. 1 is a block diagram of the card preparation system;
FIG. 2 is an illustration of the reproducing head at a remote station with an adjacent lock.

DESCRIPTION OF THE PREFERRED EMBODIMENT

Figure 3:
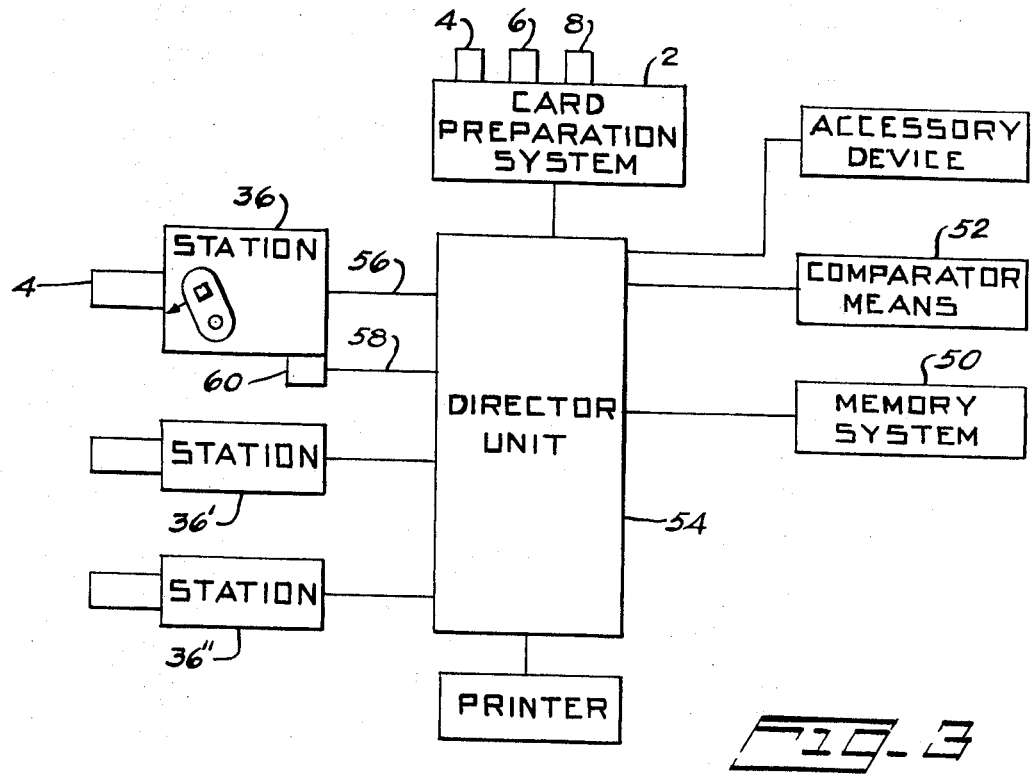
FIG. 3 is a block diagram of an identification system.

Referring now in detail to the drawings, wherein an embodiment of the invention is shown, and referring, particularly to FIG. 1, an instrument or card preparation system, generally designated by numeral 2, is used to provide coded identification cards. The card preparation system 2 generates code numbers in order to provide new codes for identification instruments or cares 4, 6, and 8. The card preparation system includes a random number generator 10 that is activated by an operator in order to select a random number for use as a code signal. The random number is transferred to a random number register 12. For safety, the system may include a reject circuit to reject numbers used in the past or numbers recently used. Thereafter the random number is recorded on the cards 4, 6, and 8.

In one embodiment of the card preparation system for a locking system, the operator selects the total number of key cards to be printed by a key card encoder 14. An area or room identification number is inserted into a room number keyboard 16. The number is transferred to the room register 18. Room encoder 20 is continuously rotated. Room number register 22 stores successively the room numbers read off the shaft encoder 20. The total sequence of the room identification numbers in the room encoder 20 are read repeatedly by the room number register 22. When the number on register 22 coincides with the number in register 18, the comparator 24 will sense the match and generate a signal to operate dump command switch 26. A signal from command switch 26 actuates the random register 12. The random register activates the encoder 14 as well as a memory system recording and reproducing head 28. Each random number in register 12 is successively transferred to the encoder 14 and the memory system recording head 28. Recording head 28 records the code number or numbers in a memory system. The code number is identified and stored in the memory system under the area or room number entered into keyboard 16. The location of the stored number in the memory may correspond to the position of the shaft encoder 20 at the particular room number entered in keyboard 16, this particular embodiment is set forth in more detail hereafter. Previous code numbers assigned to a particular room may be automatically erased when new code numbers are recorded on new cards and in the memory system. The number in the encoder 14 is transferred to recording heads 30, 32, and 34. The recording heads sweep the identification cares 4, 6, and 8 to record the code pattern and any other data on the cards.

When magnetic cards are used, the magnetic form used may be a two value system, either high-low signal level, or positive-negative identification means. Magnetic cards may be utilized along with magnetic recording and reproducing heads. A two value system will yield a binary coded number, when a train of such pulses is generated per unit time.

Referring now to FIG. 2, the remote reading station 36 includes an actuating means 38 for providing relative movement between the reproducing head 40 and the coded identification card 4. In the embodiment shown in FIG. 2, the card 4 is inserted into the remote reading station 36 to actuate switch arm 42. The switch arm 42 triggers the actuating means 38 in order to drive the reproducing head 40 across the coded information, and other information, such as, room number identification data. The room number identification data may be recorded on a portion of the remote reading station 36, illustrated by the series of lines drawn in FIG. 2. The train of electrical impulses is forwarded to a control means or command station to compare the coded data on card 4 with the stored data that is related to the particular remote station 36.

Referring now to FIG. 3, showing an embodiment of an identification locking system including the card preparation system 2, a plurality of remote stations 36, 36' and 36" at various room locations, a memory system 50, comparator means 52 with interconnected registers and comparators, and a control means 54 for directing the flow of traffic between the various components of the identification system. An operator actuates the card preparation system 2, as described hereinabove, to generate code patterns and location information. The preparation system 2 records the code patterns and location information on identification cards 4, 6, and 8 and stores the recorded data in memory system 50. The room number identification is also forwarded to the memory system 50 for storage and retrieval purposes. The subscribed data is transferred from register 12, shown in FIG. 1, to the director unit 54, shown in FIG. 3, which transfers the data to recording and reproducing head 28 in the memory system 50. When card 4 is inserted into the remote card reading station 36, the reproducing means is moved relative to the card to generate a distinct train of electrical impulses from the subscribed code pattern on the card. The train of impulses is produced by the relative movement between the reproducing means and the card. The distinct train of electrical impulses is carried along line 56 to the director unit 54 for processing in order to identify the card holder. The control means 54 conveys the input train of electrical impulses to the comparator means 52. The memory system 50 searches the memory bank for the stored code patterns assigned to the particular remote reading station 36. When the stored code pattern or patterns are found, they are transferred to the comparator means 52 by way of the control means 54. If the input code signal from remote station 36 is matched with a stored code signal, the comparator means is actuated to signal the control means of the match or mismatch. The control means sends a lock opening signal or pulse through line 58 to the locking device 60. The pulse actuates coil 62, shown in FIG. 2, to move the latch member 65 in order to open the door to allow the party carrying the card entry into the particular room. The coil 62 may be shielded and connected to an alarm means to detect any force being used to open the lock other than the lock opening signal.

As shown in FIG. 3, the subscribed code patterns assigned to a particular room are stored in the memory system 50 under a particular room number. The room number becomes part of all subsequent message transmissions between the control means 54 and the memory system 50 in order to assure complete accuracy in the operation of the system and to obtain maximum use of the memory system. Each room may be connected with the control means 54 to identify the in coming signal by a separate connection with a remote station or each station may be equipped with a permanent recorded room number, as illustrated by the lines to the left of the card 4 in FIG. 2. When the remote stations contain a recorded room number there is no necessity to connect each remote station directly to the control means 54. A single line may be connected to a plurality of stations. Also the lock opening pulse may be coded to do away with separate connections between locking devices and the control means 54.

It should be noted that in a hotel, access to each room must be provided for personnel other then guests. Regular service personnel as well as special personnel must be able to enter a locked room from time to time. Maids, cleaning people and their supervisors must be able to open all rooms to be serviced by them. Their entry cards should only open the rooms to which they are assigned and only while they are on duty. Those entry cards should not open any other rooms, and they should not open any rooms when they are off duty. For additional security and also to reduce supervisory costs, a record can be automatically stored in the memory system 50 of the real time when each card carrier gained entry in a particular room. This information may be recorded by a recorder unit, not shown at the option of the operator. A printing system, not shown, may be connected to the system to print out such information.

When an entry card for a maid is prepared by the card preparation system 2, the random number encoded on the card is stored in the memory for each of the locations corresponding to the rooms assigned. This data is also stored in a memory apart from the guest information. This information can be erased at the conclusion of a maids shift or automatically erased by the preparation of a new entry card for the maid on the succeeding shift.

Other entry cards may be prepared and assigned in a separate portion of the memory for a particular room and which may be erased after a fixed portion of time. The number of openings may also be recorded for both security or accounting reasons.

Figure 4:
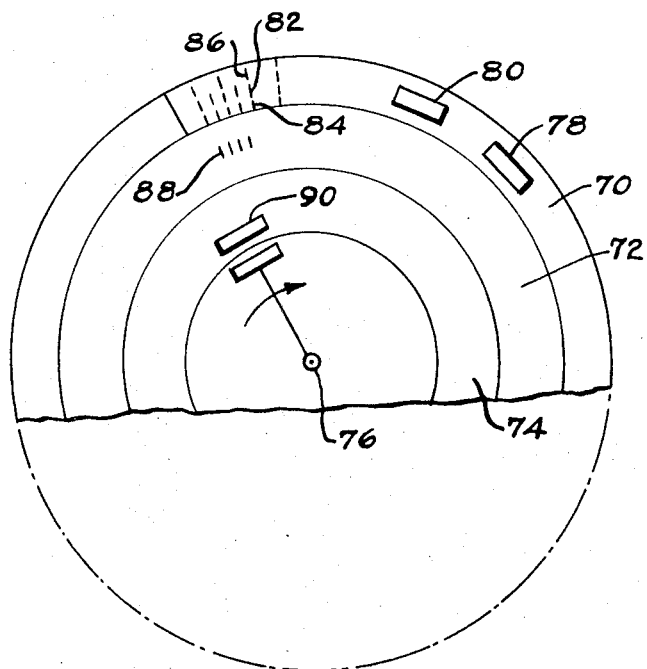
FIG. 4 is an illustration of an embodiment of the magnetic storage arrangement.

In use, when a guest registers, and is assigned a room, the room clerk actuates the random number generator 10 to generate a random number which is stored in a register 12. The clerk inserts as many cards in card encoder 14 as there are guests assigned to the room. He enters the number of the room on the room number keyboard 16. This number is stored in register 18. One embodiment, shown in FIG. 4, illustrates a magnetic disc 70, a digital shaft encoder 72 and a rotary switch 74 coupled together for continuous rotation about shaft 76. Digital shaft encoder 72 may be used for encoder 20, shown in FIG. 1. Room number register 22 stores successively the numbers read off the shaft encoder 72. When the number in register 22 coincides with the number in register 18, comparator 24 senses the identity and actuates dump command switch 26 to actuate register 12. The register 12 actuates the encoder 14, the recording heads are moved across cards in the encoder 14. Each number stored in random number register 12 is successively transferred to recording heads 78 to be recorded on magnetic disc 70. When guest cards are being produced the recording head records the code number on the guest track 82. When other service cards are being produced the recording head may be shifted to other tracks 84 or 86. When the numbers are read out of random number register 12, the numbers are automatically erased or destroyed from the register 12 so that no additional duplicate cards can be made at a later time. The various codes are stored in the memory, as shown in FIG. 4 at 82, 84 and 86, in an area adjacent one another in separate tracks at a location corresponding to a particular room number, shown at 88 on shaft encoder 72. The room number location also corresponds to a position on rotary switch 74 which is connected to a wire that is attached to the room lock solenoid, through contact 90, to a common input power source by way of the shaft 76. When a guest inserts his card into remote reader 36 at the room door and the binary code signals from the card are identical to the code stored in the memory, contact 90 will be connected to the power source to open the particular room lock.

When a guest inserts a card into the remote station 36, shown in FIG. 2, the arm begins sweeping the card to read the information stored on the card and the information, if any, stored on the remote station. The train of electric impulses is forwarded to the control means 54, shown in FIG. 3, for temporary storage in a register in the comparator means.

Referring again to FIG. 4, as disc 70 rotates under reproducing head 80 the number code for each room is read out and transmitted to a register in the comparator means. The room number from disc 72 appears in a room number register. If a comparator in the comparator means shows the room number at the station and the room number at the disc memory to be identical, a first pulse signal indicates that the proper stored information has been found. The comparator means then compares the code number stored in the registers with the code number read off the card and temporarily stored in another register in the comparator means. When the code numbers are similar a second pulse is sent out. When the first and second pulse signals from the comparator means meet, an unlatch pulse is sent through rotary switch 74 to the correct room number to the unlocking solenoid to unlatch the room door. When the two signals do not match any of the stored code numbers on tracks 82, 84 and 86, then an auxiliary alarm may be sounded and the room number displayed to indicate to security personnel that entry at a particular room has been attempted by an unauthorized person. The alarm and display may be part of the accessory equipment connected to the director unit 54.

When unlatch occurs because of a match, and the room is opened to maids or service personnel, the information may also be recorded at another point along with real time information for supervisory or accounting purposes.

A maid or supervisor may require access and a key to several rooms on a single day. One may prepare a single key capable of opening the assigned rooms by recording the submaster key code number under a plurality of room numbers on a single track, for example track 86, as shown on FIG. 4. The submaster key code number will replace the earlier maid's submaster key, but not interfere with the guest's key. A lock may be provided for the card in the encoder 14 so that it cannot be removed nor additional cards inserted until the operation is complete. The random number in register 12 is retained when a maid's submaster key is being made. After writing the submaster key number at the first room location on record disc the same number is written on the record disc at each additional room location until all assigned rooms have been so recorded. Then the encoder 14 may be unlocked in order that the card may be removed and the number stored in register 12 may be erased.

The facility available for storage and recall of information on a particular room may be put to additional uses other than locking an unlocking doors. When a guest checks out, a new key code may be stored without preparation of a card, thereby preventing the guest from reentering the room. Another track may be used on the disc to indicate that the room is vacant. Then all the hotel rooms are scanned with every revolution of the disc to note which rooms are vacant, so that a display of vacant rooms can be maintained constantly at various local location or remote locations. Reservations information may be recorded on another track of the disc. Telephone calls, requests to make up a room, and telephone call charges, room service charges and other charges may be stored on accessory tracks in a similar manner. Every guest room charge may be recorded to simplify bookkeeping and to verify charges.

The embodiment shown in FIG. 4, a mechanical disc for storing data is a noncomplex embodiment. In practice it may be more economic to use other types of memory devices having automatic storage and retrieval. The control means may be a switch device or a computer device.

With the locking system described above, failure of the system would maintain security, but access to the rooms would be prevented. Such a system failure can be largely eliminated by redundancy of the entire system, except for the cards. There might be two tracks on the card and two reading and two storage, retrieval and generating systems, with a single solenoid and latch. The main and service personnel could note when a single unlatch noise is heard. They could thus detect failure of half of the system before the entire operation is affected. In the event of failure of an individual lock, access holes are provided through which punches may be inserted. A sledge hammer blow to the punch will shear or break a replacable bolt which allows the door to be opened. This legitimate forcing may be easily repaired. Microphones or other detecting means may be used to prevent improper use of the punch hole to gain unlawful entry into a room. Various alarm means may be connected to all wires in the system to detect breaks in the circuit.

A card may also be permanently inscribed with a code number which identifies an employee. This card can be used as an employee time card. The card reader, in the same fashion as the room lock, reads the pulse train off the card. This would be combined with real time information to be stored or fed directly to a computer to make up the employee's payroll.

Further, this system may be used as a security guard system when guards make their rounds. The readers at various locations would be able to identify the guard and the time he placed his card into a reader at a particular location. This information can be easily fed from remote location over telephone lines. Any failure can immediately signal an alarm. Among the advantages of such a system is that one memory console could supply an entire police force or private commercial city security patrol with data related to the location of their men. Since a new key may be prepared immediately and automatically, checking a watchman's path during his rounds in noncomplex. Scheduling patrolmen to various paths may be changed daily and stored in the memory for immediate use. Since new keys are easily prepared prior to going on duty at a particular location, copying would be difficult, especially when different code numbers are programmed into the memory each day. It should be noted that a recording head may be added to each remote station to allow the controller to change a code number during the partrolmans rounds for additional security purposes.

The instant invention has been shown and described herein in what is considered to be the most practical and preferred embodiment. It is recognized, however, that departures may be made therefrom within the scope of the invention. Therefore, the instant invention is not to be limited to the details discussed herein but to be accorded the full scope of the claims so as to embrace any and all equivalent apparatus and articles.

What I claim is:

1. An identification system for at least one identification instrument comprising,
   a memory system,
   at least one instrument,
   at least one remote instrument reading station,
   an instrument preparation system for storing data on each instrument, said instrument preparation system connected to said memory system for also storing said data in said memory system in relation to a particular instrument and a particular reading station for retrieval purposes,
   each reading station including a data reading means for reading an instrument placed in contact with said reading station, said reading means includes apparatus to generate a train of electrical impulses from said data stored on said instrument when placed in said station, and
   a comparator connected to said memory system and the remote reading station to compare the data in the form of a train of electrical impulses from a particular instrument in the particular remote reading station with the stored data related to the particular instrument and the particular reading station, whereby the relationship of a particular instrument in a particular reading station may be identified.

2. An identification system as set forth in claim 1, including,
   a first and second instrument,
   a first and second remote reading stations,
   said preparation system including means to store differing code data on the first and second instrument prepared for use with the first and second remote reading stations respectively, said preparation system storing in said memory system the differing code data on the first and second instrument in relation to the first and second remote reading stations respectively, and
   said comparator connected to said memory and each reading station for indicating a match or mismatch of data from an instrument in a particular reading station with the data stored in said memory system.

3. An identification system as set forth in claim 2, wherein,
   each said remote reading station includes stored data identifying the particular station when the data is read by the data reading means and actuating means to initiate the data reading cycle, and said memory system includes an automatic means for locating the stored data for a particular reading station for comparison purposes when the station is actuated by an instrument.

4. An identification system as set forth in claim 2, including, a lock means adjacent each remote reading station, said lock means including a bolt and a bolt moving means, and said comparator connected to said bolt moving means for actuating said bolt moving means to open the lock means when a match is indicated by said comparator.

5. An identification system as set forth in claim 4, wherein, said instrument preparation system includes means for preparing instruments for use in a single reading station, and a second category of instruments for use in a plurality of reading stations, and said memory system storing data from said preparation system for both the first and second category of instruments.

6. An identification system for coded instruments comprising,
a memory system,
at least one instrument,
at least one reading station,
an instrument preparation system for storing data on the instruments, said instrument preparation system connected to said memory system for also storing said data in relation to a reading station in said memory system,
a reproducing circuit,
a reproducing head in each said station, said head connected to said reproducing circuit for generating a train of electrical impulses from the coded instrument placed in a reading station,
a movable member connected to said reading station,
a moving means connected to said movable member for providing relative movement between said reproducing head and the coded instrument placed in said reading station to produce the train of impulses, and
a triggering means connected to said moving means to actuate said moving means when said instrument contacts said station,
a comparator connected to said memory system and said reproducing circuit for comparison of the data stored in the memory system with the train of electrical impulses generated from the instrument for identifying the instrument in relation to said reading station.

7. An identification system as set forth in claim 6, including,
a first and second instrument,
a first and second remote reading stations,
said preparation system including means to store differing code data on the first and second instrument prepared for use with the first and second remote reading stations respectively, said preparation system storing in said memory system the differing code data on the first and second instrument in relation to the first and second remote reading stations respectively, and
said comparator connected to said memory and each reading station for indicating a match or mismatch of data from an instrument in a particular reading station with the data stored in said memory system.

8. A reading station as set forth in claim 7, including,
a lock means adjacent each remote reading station, said lock means including a bolt and a bolt moving means, and
said comparator connected to said bolt moving means for actuating said bolt moving means to open the lock means when a match is indicated by said comparator.